| United States Patent [19] | [11] Patent Number: 4,461,880 |
|---|---|
| Gimpel et al. | [45] Date of Patent: Jul. 24, 1984 |

[54] SURFACE-COATING BINDERS WHICH CONTAIN BLOCKED ISOCYANATE GROUPS AND ARE SUITABLE FOR CATHODIC ELECTROCOATING

[75] Inventors: Juergen Gimpel, Ludwigshafen; Volker Schwendemann, Wiesenbach; Hans-Uwe Schenck, Wachenheim; Erich Gulbins, Heidelberg, all of Fed. Rep. of Germany

[73] Assignee: BASF Aktiengesellschaft, Fed. Rep. of Germany

[21] Appl. No.: 410,838

[22] Filed: Aug. 23, 1982

[30] Foreign Application Priority Data

Aug. 26, 1981 [DE] Fed. Rep. of Germany ....... 3133770

[51] Int. Cl.$^3$ .............................................. C08L 63/00
[52] U.S. Cl. .................... 525/528; 525/111; 523/406
[58] Field of Search ......................................... 525/528

[56] References Cited

U.S. PATENT DOCUMENTS

| 3,399,128 | 8/1968 | Brewer et al. | 204/181 R |
|---|---|---|---|
| 3,761,371 | 9/1973 | Dickie et al. | 204/181 C |
| 3,883,483 | 5/1975 | Anderson et al. | 260/77.5 TB |
| 3,976,615 | 8/1976 | Sekmakas | 260/29.6 HN |
| 4,085,161 | 4/1978 | Sekmakas et al. | 525/528 |
| 4,336,346 | 6/1982 | Gimpel et al. | 525/528 |

FOREIGN PATENT DOCUMENTS 3017603 11/1981 Fed. Rep. of Germany.

OTHER PUBLICATIONS

Houben-Weyl, "Methoden der Organischen Chemie", vol. 14/2, (1963), pp. 61–70.
W. Machu "Elektrotauchlackierung", (1974), pp. 155–179.

*Primary Examiner*—John C. Bleutge
*Assistant Examiner*—A. L. Carrillo
*Attorney, Agent, or Firm*—Keil & Weinkauf

[57] ABSTRACT

Surface-coating binders based on a copolymer which contains tertiary amino groups, blocked isocyanate groups, hydroxyl groups and ether groups and which, due to partial or complete salification with an acid, is water-soluble or water-dispersible.

The copolymer contains, as copolymerized units, an olefinically unsaturated compound possessing a tertiary amino group, an N-(alk-1-enyl) isocyanate blocked with a CH-, OH- or NH-acidic blocking agent, and an adduct of an epoxy resin based on bisphenol A and epichlorohydrin, and having a molecular weight of from 380 to 3,500, with an olefinically unsaturated alcohol of 3 to 20 carbon atoms, and with an olefinically unsaturated carboxylic acid of 3 to 20 carbon atoms, with or without one or more other copolymerizable olefinically unsaturated compounds, and has a mean molecular weight of from 1,000 to 20,000.

The novel surface-coating binder is useful, either as a self-crosslinking binder or as a binder which needs an external crosslinking agent, for the cathodic electrocoating of metallic articles.

6 Claims, No Drawings

SURFACE-COATING BINDERS WHICH CONTAIN BLOCKED ISOCYANATE GROUPS AND ARE SUITABLE FOR CATHODIC ELECTROCOATING

The present invention relates to surface-coating binders based on copolymers containing tertiary amino groups, blocked isocyanate groups, hydroxyl groups and ether groups, and their use for electrocoating.

The use, in electrocoating, of binders consisting of acrylate resin crosslinked by isocyanates has been disclosed. For example, U.S. Pat. No. 3,883,483 discloses a polymer composition for cathodic electrocoating, which contains the reaction product of a diisocyanate, having one blocked isocyanate group, with an ethylenically unsaturated hydroxy compound, such as hydroxyethyl acrylate. However, as a result the isocyanate group required for crosslinking is bonded to the polymer carbon chain by an ester bond. A proportion of the ester bonds is cleaved by hydrolysis as the electrocoating bath ages. Consequently, the composition of the components required for crosslinking changes as the bath ages, leading to poorer chemical resistance, and poorer anti-corrosion properties, of the coatings produced.

U.S. Pat. No. 3,976,615 describes electrocoating binders based on polyethers which contain from 1.2 to 2 unsaturated ether groups per molecule and which are copolymerized with unsaturated monomers containing amino groups, for example dimethylaminoethyl methacrylate. N-Alkoxymethyl-acrylamides and -methacrylamides, phenoplasts and aminoplasts are mentioned as crosslinking agents. These agents, however, make the electrocoating bath very voltage-sensitive. If the crosslinking agent is dispensed with, the resistance to chemicals and the mechanical properties of the finishes are no longer satisfactory.

German patent application No. P 3,017,603.5 describes electrocoating binders which contain blocked N-(alk-1-enyl) isocyanates and allyl-modified polyethers as comonomers. However, the bath stability of these finishes is not always ensured when a pigment is present.

It is an object of the present invention to provide electrocoating binders which give coatings having good anti-corrosion properties and baths having adequate stability even when a pigment is present.

For effecting the crosslinking reaction, these binders should contain a defined amount of blocked isocyanate groups directly bonded to the carbon chain of the polymer. The polymer molecule may or may not contain other reactive groups, so that the polymers may be employed as self-crosslinking binders or as binders which need an external crosslinking agent.

We have found that this object is achieved by providing copolymers which in addition to a blocked N-(alk-1-enyl) isocyanate contain modified epoxy resins based on bisphenol A as copolymerized units, some of the epoxide groups being esterified with an olefinically unsaturated alcohol, preferably an allyl-containing alcohol, and the remainder of the epoxide groups being esterified with olefinically unsaturated carboxylic acids. Surprisingly, the copolymers obtained with such modified epoxy resins are non-crosslinked.

The present invention relates to a surface-coating binder which is useful for the cathodic electrocoating of metallic articles and is based on a copolymer which contains tertiary amino groups, blocked isocyanate groups, hydroxyl groups and ether groups and which, due to partial or complete salification with an acid, is water-soluble or water-dispersible, and wherein the copolymer contains, as copolymerized units, (A) from 6 to 22% by weight of one or more olefinically unsaturated compounds containing a tertiary amino group, (B) from 10 to 35% by weight of an N-(alk-1-enyl) isocyanate blocked with a CH-, OH- or NH-acidic blocking agent, (C) from 20 to 70% by weight of an adduct of an epoxy resin, based on bisphenol A and epichlorohydrin and having a molecular weight of from 380 to 3,500, with (a) an olefinically unsaturated alcohol of 3 to 20 carbon atoms and with (b) an olefinically unsaturated carboxylic acid of 3 to 20 carbon atoms, and (D) from 0 to 64% by weight of one or more copolymerizable olefinically unsaturated compounds not already mentioned under (A) to (C), with the proviso that the copolymer has a mean molecular weight of from 1,000 to 20,000 and that the sum of the percentages of (A) to (D) is 100.

The present invention further relates to a process for the cathodic electrocoating of metallic articles, wherein these binders are used either as self-crosslinking binders or in combination with a polyfunctional crosslinking agent as externally crosslinking binders.

The electrocoating finish produced therefrom contains in general from 5 to 20% by weight of the novel protonized copolymer.

The following details are to be noted regarding the constituents of the novel binder:

(A) Suitable components (A) are conventional ethylenically unsaturated compounds having a tertiary amino group, for example tertiary aminoalkyl acrylates and methacrylates, such as dialkylaminoalkyl acrylates and methacrylates, where alkyl is of 1 to 8, preferably 1 to 4, carbon atoms, eg. N,N-dimethylaminoethyl methacrylate or N,N-diethylaminoethyl acrylate, or tertiary aminoalkyl acrylamides and methacrylamides, where alkyl is of 1 to 8, preferably 1 to 4, carbon atoms, eg. N,N-dimethylaminopropyl acrylamide and methacrylamide and N,N-diethylaminopropyl acrylamide and methacrylamide.

The novel binders contain from 6 to 22, preferably from 6 to 15, in particular from 8 to 13, % by weight of component (A) as copolymerized units, aminoalkyl acrylamides and methacrylamides being particularly preferred.

(B) Component (B) is an adduct of an N-(alk-1-enyl) isocyanate and a CH-, OH- or NH-acidic blocking agent. Suitable N-(alk-1-enyl) isocyanates are those where alkenyl is of 2 to 4 carbon atoms, preferably vinyl isocyanate and/or propenyl isocyanate. Examples of suitable blocking agents for the preparation of component (B) are monophenols, eg. phenol, cresol and trimethylphenol, primary and secondary alcohols, eg. isopropanol and cyclohexanol, tertiary alcohols, eg. t-butanol and t-amyl alcohol, easily enolizable compounds, eg. ethyl acetoacetate, acetylacetone, malonic acid derivatives, eg. diesters of malonic acid with alcohols of 1 to 8 carbon atoms, and malodinitrile, secondary aromatic amines, eg. N-methylaniline, N-methyltoluidine and N-phenyltoluidine, imides, eg. succinimide and phthalimide, lactams, eg. ε-caprolactam, δ-valerolactam and laurolactam, oximes, eg. acetone-oxime, butanone-oxime and cyclohexanone-oxime, and aromatic triazoles, eg. triazabenzene. Particularly preferred blocking agents of the N-(alk-1-enyl) isocyanate are t-butanol, cyclohexanol, ε-caprolactam and methyl ethyl ketone-oxime.

The blocked N-(alk-1-enyl) isocyanate, eg. the blocked vinyl isocyanate, can be prepared, for example, by a method similar to that given in Houben-Weyl, Methoden der organischen Chemie, volume 14/2 (1963), page 61–70. Preferably, the preparation is carried out in the presence of a solvent. The reaction of the N-(alk-1-enyl) isocyanate (vinyl isocyanate) with the blocking agent is carried out with about equimolar amounts. An excess of isocyanate is to be avoided, since it may subsequently cause crosslinking.

The novel copolymer contains from 10 to 35, preferably from 15 to 25, % by weight of component (B) as copolymerized units.

(C) Component C is a reaction product of an epoxy resin of bisphenol A and epichlorohydrin, having a molecular weight of from 380 to 3,500, with (a) an olefinically unsaturated alcohol on the one hand and with (b) an olefinically unsaturated carboxylic acid on the other hand. The molecular weight of the epoxy resin, before reaction with the components (a) and (b), is preferably from 380 to 1,400.

(a) Examples of suitable olefinically unsaturated alcohols (a) of 3 to 20 carbon atoms are allyl alcohol, geraniol, but-1-ene-3-ol, farnesol, soybean alcohol and linseed oil alcohol, and alkanol allyl ethers and alkanol allyl thioethers, where alkanol is of 2 to 6 carbon atoms, eg. allyl hydroxypropyl ether and hydroxyethyl allyl thioether, and alk-1-enyl-ω-ols of 4 to 20 carbon atoms, eg. but-1-ene-4-ol, esters of diols with monoacrylic and methacrylic acid, eg. 2-hydroxyethyl acrylate, 2-hydroxypropyl acrylate, butanediol monoacrylate, 2-hydroxyethyl methacrylate, 2-hydroxypropyl methacrylate and butanediol monomethacrylate, and unsaturated polyols, eg. vinylglycol. A preferred component (a) is allyl alcohol.

(b) Examples of suitable olefinically unsaturated carboxylic acids (b) of 3 to 20 carbon atoms are copolymerizable α,β-olefinically unsaturated monocarboxylic acids, eg. acrylic acid, methacrylic acid, and crotonic acid, and half esters of α,β-olefinically unsaturated dicarboxylic acids, such as maleic acid, itaconic acid, citraconic acid and mesaconic acid, with, for example, C1–C20 alkanols, preferably C3–C8-alkanols. In the epoxy resin based on bisphenol A and epichlorohydrin, in general from 20 to 90, preferably from 40 to 70, mole % of the epoxide groups are etherified with an olefinically unsaturated alcohol which preferably contains one allyl group, and from 10 to 80, preferably from 60 to 30, mole % of the epoxide groups are esterified with an olefinically unsaturated monocarboxylic acid.

A particularly preferred component (C) is the reaction product of an epoxy resin, having a mean molecular weight of about 900, with from 40 to 60 mole % of allyl alcohol or but-1-ene-3-ol and from 40 to 60 mole % of acrylic acid or methacrylic acid.

The novel copolymer contains from 20 to 70, preferably from 35 to 60,% by weight of component (C) as copolymerized units.

(D) Suitable components (D) are copolymerizable olefinically unsaturated compounds not already mentioned under (A) to (C), such as esters of acrylic acid or methacrylic acid with monoalcohols of 1 to 18, preferably 1 to 8, carbon atoms, eg. methyl acrylate, ethyl acrylate, butyl acrylate, 2-ethylhexyl acrylate and methyl methacrylate. Any other copolymerizable unsaturated compounds may also be used, in particular vinyl esters of carboxylic acids of 2 to 10 carbon atoms, eg. vinyl acetate, vinyl propionate and vinyl pivalate, vinyl-aromatics, eg. styrene, acrylonitrile and olefinically unsaturated triglycerides, eg. isomerized linseed oil, as well as mixtures of the said monomers.

The novel copolymer contains from 0 to 64, preferably from 2 to 42,% by weight of component (D) as copolymerized units.

Advantageously, the novel copolymers are prepared in polar solvents devoid of OH groups, such as ethers, eg. tetrahydrofuran, or esters, eg. ethyl acetate or n-butyl acetate, in the presence of free radical initiators, eg. azo-bis-carboxamides, azo-bis-carboxylic acid nitriles, or peroxides, in general at from 50° to 120°C., preferably from 60° to 90° C., in the presence or absence of a regulator, eg. mercaptoethanol, t-dodecylmercaptan or diisopropylxanthogen disulfide. Examples of particularly preferred binders are copolymers of from 8 to 13% by weight of N,N-dimethylaminopropyl-acrylamide or -methacrylamide, from 15 to 25% by weight of vinyl isocyanate blocked with caprolactam or methyl ethyl ketone-oxime, from 35 to 60% by weight of a reaction product of an epoxy resin, obtained from bisphenol A and epichlorohydrin and having a mean molecular weight of 900, with a mixture of allyl alcohol and acrylic acid, and from 2 to 42% by weight of 2-ethylhexyl acrylate.

The novel copolymers are non-crosslinked products having a mean molecular weight of from 1,000 to 20,000, preferably from 2,000 to 10,000 (measured by a vapour pressure osmometer). The K values (determined by the Fikentscher method on a 3% strength solution in glacial acetic acid) are correspondingly from about 15 to 35, preferably from 18 to 24.

The copolymers may also be quaternized after their preparation. For this purpose, they are reacted with an epoxide, eg. ethylene oxide, propylene oxide, or butylene oxide, or a glycide, in the presence of an acid, or treated with an alkylating agent, eg. methyl iodide or dimethylsulfoxide.

The novel copolymers contain tertiary amino groups and blocked isocyanate groups, may or may not contain quaternary ammonium groups, and structures which are reactive toward isocyanate groups, and possess carbon-carbon double bonds which on baking the surface coatings contribute to the crosslinking.

According to the invention, these copolymers are used as surface-coating binders and are water-soluble or water-dispersible due to partial or complete salification with acids.

For such salification, the compounds are partially or completely neutralized with an acid; the latter may be inorganic or organic, acetic acid, lactic acid and gluconic acid being preferred. The degree of neutralization required for use of the novel surface-coating binders in an aqueous medium is from 10 to 120%.

In addition to the novel binder, the surface-coating may contain polyfunctional crosslinking agents, such as hydroxyl-containing polymers, polyesters or polyadducts, eg. aminoplasts or phenol-formaldehyde resins, as well as pigments, eg. titanium dioxide, talc and carbon black, in amounts which, depending on the application, are from 10 to 80, preferably from 20 to 65, parts by weight per 100 parts by weight of binder. Furthermore, it may contain inorganic and organic colored pigments, and fillers, each in amounts of not more than 5 parts by weight. Furthermore, not more than 10 parts of a leveling agent, not more than 10 parts of a wax to increase the scratch resistance, and not more than 2 parts of a catalyst for the unblocking reaction, eg. dibutyl-tin dilaurate, may be present per 100 parts of binder.

The novel surface-coating binders are used in particular for cathodic electrocoating, as self-crosslinking binders or as binders requiring an external crosslinking agent.

The novel electrocoating finishes may in particular be used to coat metallic articles, for example those consisting of iron, steel or aluminum.

The cationic electrocoating baths are prepared in a conventional manner, for example as described in W. Machu, Elektrotauchlackierung (1974), page 155 et seq. The solids content of the electrocoating baths is in general from 5 to 25% by weight and the pH from 4.0 to 7.5.

The coatings obtained using the novel binder are very hard, very resilient, and resistant to chemicals, and provide good protection from corrosion. Aging of the bath does not have an adverse effect on the said good properties. In particular, the novel surface-coating binder possesses very good bath stability, even when a pigment is present.

In the examples which follow, parts and percentages are by weight, unless stated otherwise.

Preparation of Component (B)

(B 1) tert.-Butyl N-vinylcarbamate 69 parts of vinyl isocyanate and 70 parts of ethyl acetate are introduced into a rection vessel equipped with a high-efficiency condenser (employing cooling brine), stirrer, thermometer and feed vessel. 74 parts of tert.-butanol, 73 parts of ethyl acetate and 0.01% of dibutyl-tin dilaurate are added in the course of 1 hour at 40° C. The reaction is then allowed to continue for 10 hours at 40° C. A pale yellow clear solution results. Blocked isocyanate content: 14.7%.

(B 2) Cyclohexyl N-vinylcarbamate 69 parts of vinyl isocyanate and 89.5 parts of ethyl acetate are introduced into a reaction vessel and heated to 40° C. A mixture of 110 parts of cyclohexanol and 89.5 parts of ethyl acetate (containing 0.02% of dibutyl-tin dilaurate as catalyst) is added in the course of 1 hour. The mixture is then allowed to react for 2 hours at 40° C. A pale yellow solution is obtained, from which the reaction product crystallises out on cooling. Blocked isocyanate content: 11.7%.

(B 3) N-(N'-vinylcarbamoyl)-caprolactam 113 parts of ε-caprolactam and 91 parts of ethyl acetate (+0.015% of dibutyl-tin dilaurate) are introduced into a reaction vessel and the mixture is heated to about 50° C. A mixture of 69 parts of vinyl isocyanate and 91 parts of ethyl acetate is then added dropwise in the course of 1 hour, after which the mixture is allowed to react for .5 hours. A pale yellow clear solution is obtained. Blocked isocyanate content: 11.5%.

Preparation of component (C)

(C 1) (for comparison polymer)

250 parts of epoxy resin obtained from bisphenol A and epichlorohydrin and having a mean molecular weight of 900 and an epoxide value of 0.2 to 0.223, and 400 parts of allyl alcohol, are mixed, and heated at 80° C. until a homogeneous solution has formed.

1.75 parts of boron trifluoride diethyl etherate solution, 75 parts of allyl alcohol and 0.1 part of hydroquinone monomethyl ether are added, the mixture is refluxed for 2 hours, the excess alcohol is then distilled off, and the product is taken up in ethyl acetate. A clear yellowish solution having an epoxide value of 0.00 and a solids content of 61% is obtained.

(C 2) 200 parts of allyl alcohol, 62.1 parts of acrylic acid, 1.25 parts of boron trifluoride diethyl etherate solution and 2.41 parts of hydroquinone are heated to 90° C. under nitrogen. Feed mixture 1, consisting of 2,154.75 parts of an epoxy resin obtained from bisphenol A and epichlorohydrin, and having a mean molecular weight of 900 and an epoxide value of 0.2–0.223, dissolved in 718.25 parts of methyl ethyl ketone, and feed mixture 2, consisting of 1.25 parts of boron trifluoride diethyl etherate solution in 100 parts of methyl ethyl ketone, are metered in simultaneously in the course of 2.5 hours at 90° C. The mixture is kept at 90° C. for a further hour, and then cooled. A yellowish clear solution having an epoxide value of 0.00 and a solids content of 74.8% is obtained.

(C 3) 150 parts of allyl alcohol, 124.1 parts of acrylic acid, 1.25 parts of boron trifluoride diethyl etherate solution and 2.42 parts of hydroquinone are heated to 90° C. under nitrogen. Feed mixture 1, consisting of 2,154.75 parts of the epoxide resin from C 2 and 718.25 parts of methyl ethyl ketone, and feed mixture 2, consisting of 1.25 parts of boron trifluoride diethyl etherate solution and 100 parts of methyl ethyl ketone, are metered in simultaneously in the course of 2.5 hours at 90° C. The mixture is kept at 90° C. for a further hour, and then cooled. A clear yellowish solution having an epoxide value of 0.00 and a solids content of 73.4% is obtained.

(C 4) 125 parts of allyl alcohol, 155.2 parts of acrylic acid, 1.25 parts of boron trifluoride diethyl etherate solution and 2.42 parts of hydroquinone are heated to 90° C. under nitrogen. Feed mixture 1, consisting of 2,155.2 parts of the epoxide resin from C 2 and 1,436.8 parts of methyl ethyl ketone, and feed mixture 2, consisting of 1.25 parts of boron trifluoride diethyl etherate solution and 100 parts of methyl ethyl ketone, are metered in simultaneously in the course of 2.5 hours at 90° C. After a further hour at 90° C., the resulting clear yellowish solution is cooled to room temperature. It has an epoxide value of 0.00 and a solids content of 62.7%.

(C 5) 87.5 parts of allyl alcohol, 201.76 parts of acrylic acid, 1.25 parts of boron trifluoride diethyl etherate solution and 2.42 parts of hydroquinone are heated to 90° C. under nitrogen. Feed mixture 1, consisting of 2,155.2 parts of the epoxy resin from C 2 and 1,436.8 parts of methyl ethyl ketone, and feed mixture 2, consisting of 1.25 parts of boron trifluoride diethyl etherate solution and 100 parts of methyl ethyl ketone, are metered in simultaneously in the course of 2.5 hours at 90° C. After a further hour at 90° C., the resulting clear yellowish solution is cooled to room temperature. It has an epoxide value of 0.00 and a solids content of 59.6%.

(C 6) 50 parts of allyl alcohol, 248.3 parts of acrylic acid, 1.25 parts of boron trifluoride diethyl etherate solution and 2.42 parts of hydroquinone are heated to 90° C. under nitrogen. Feed mixtures 1 and 2, which have the compositions given in C 5, are metered in in the course of 2.5 hours at 90° C. After a further hour at 90° C., the resulting clear yellowish solution is cooled to room temperature. It has an epoxide value of 0.00 and a solids content of 59.2%.

Preparation of the Copolymer Solutions

Polymer 1 (comparative polymer)

30% of a feed mixture consisting of 400 parts of the adduct (B 3), 819 parts of the component (C 1), 60 parts of dimethylaminopropyl methacrylamide, 240 parts of 2-ethylhexyl acrylate, 12 parts of t-dodecyl mercaptan, 20 parts of azo-bis-isobutyronitrile and 48 parts of ethyl acetate is initially introduced into a reaction vessel equipped with a stirrer, reflux condenser and internal thermometer. The initial charge is heated to 80° C. under nitrogen, and the feed is added in the course of 3 hours at 80° C. Polymerization is continued for 1 hour, 5 parts of azo-bis-isobutyronitrile are added, and the polymerization is then continued for a further hour at 80° C. A clear solution of a resin, having a K value of 18.3, is obtained, the solids content being 59.5%.

Polymers According to the Invention

Polymer 2

A polymer solution is prepared as described for polymer 1, but using 400 parts of the adduct (B 3), 817.4 parts of the component (C 3), 60 parts of dimethylaminopropyl methacrylamide, 140 parts of 2-ethylhexyl acrylate, 5 parts of t-dodecyl mercaptan, 20 parts of azo-bis-isobutyronitrile and 249 parts of ethyl acetate. A clear solution of a resin, having a K value of 22.4, is obtained, the solids content being 59.8%.

Polymer 3

A polymer solution is prepared as described for polymer 1, but using 400 parts of the adduct (B 3), 801 parts of the component (C 4), 120 parts of dimethylaminopropyl methacrylamide, 180 parts of 2-ethylhexyl acrylate, 7 parts of t-dodecyl mercaptan, 20 parts of azo-bis-isobutyronitrile and 166 parts of ethyl acetate. A clear solution of a resin, having a K value of 22.7, is obtained, the solids content being 58.8%.

Polymer 4

A polymer solution is prepared as described for polymer 1, but using 400 parts of the adduct (B 3), 798 parts of the component (C 4), 90 parts of dimethylaminopropyl methacrylamide, 210 parts of 2-ethylhexyl acrylate, 8 parts of t-dodecyl mercaptan, 20 parts of azo-bis-isobutyronitrile butyronitrile and 169 parts of ethyl acetate. A clear solution of a resin, having a K value of 19.9, is obtained, the solids content being 59.3%.

COMPARATIVE EXAMPLE

Electrocoating Finish 1

126 parts of the 59.5% strength solution of polymer 1, 45 parts of titanium dioxide (eg. Tioxide RTC90), 1,275 parts of acetic acid, 8 parts of isodecanol and 823 parts of water are worked in a ball mill to give a dispersion having a solids content of 12% by weight.

Electrocoating Finishes According to the Invention

Electrocoating Finish 2

125 parts of 59.8% strength solution of polymer 2, 45 parts of titanium dioxide, 1,275 parts of acetic acid, 8 parts of isodecanol and 823 parts of water are worked in a ball mill to give a dispersion having a solids content of 12% by weight. The dispersion is stirred for 24 hours at 30° C., before being used for electrocoating.

Electrocoating Finish 3

128 parts of the 58.8% strength solution of polymer 3, 45 parts of titanium dioxide, 1,875 parts of acetic acid, 8 parts of isodecanol and 820 parts of water are worked in a ball mill to give a dispersion having a solids content of 12% by weight, and this dispersion is stirred thoroughly at 30° C. as described above.

Electrocoating Finish 4

127 parts of the 59.3% strength solution of polymer 4, 45 parts of titanium dioxide, 1,425 parts of acetic acid, 9 parts of isodecanol and 821 parts of water are worked in a ball mill to give a dispersion having a solids content of 12% by weight, and this dispersion is stirred thoroughly at 30° C. as described above.

These electrocoating finishes are used for electrocoating zinc-phosphatized iron sheet for a period of 2 minutes; the coating is then baked for 30 minutes at 190° C. The properties of the electrocoating finishes and of the coated iron sheet are given in the table below.

| Electrocoating Finish No. | 1 | 2 | 3 | 4 |
|---|---|---|---|---|
| Bath stability 24 hours/30°C. | ([1]) | ([2]) | ([2]) | ([2]) |
| pH | 4.5 | 4.9 | 6.1 | 5.5 |
| Deposition voltage [V] | 150 | 180 | 100 | 110 |
| Coating thickness [μm] | 20 | 21 | 20 | 19 |
| Pendulum hardness [sec] (DIN 53157) | 175 | 178 | 176 | 175 |
| Erichson value [mm] (DIN 53156) | 5.5 | 5.5 | 6.0 | 6.3 |
| Crosshatch test (DIN 53151) | GT1 | GT1 | GT0-1 | GT0-1 |
| Corrosion protection [hours/mm] (DIN 50021) | 200/5 | 200/4.5 | 200/2.5 | 200/3.1 |

[1] Not given.
[2] Satisfactory.

We claim:

1. A surface-coating binder suitable for the cathodic electrocoating of metallic articles, and based on a copolymer which contains tertiary amino groups, blocked isocyanate groups, hydroxyl groups and ether groups and which, due to partial or complete salification with an acid, is water-soluble or water-dispersible, and wherein the copolymer contains, as copolymerized units, (A) from 6 to 22% by weight of one or more olefinically unsaturated compounds containing a tertiary amino group, (B) from 10 to 33% by weight of an N-(alk-1-enyl) isocyanate blocked with a CH-, OH- or NH-acidic blocking agent, (C) from 20 to 70% by weight of an adduct of an epoxy resin, based on bisphenol A and epichlorohydrin and having a molecular weight of from 380 to 3,500, whereby (a) 20 to 90 mole % of the epoxide groups are etherified with an olefinically unsaturated alcohol of 3 to 20 carbon atoms and (b) 10 to 80 mole % of the expoxide groups are esterified with an olefinically unsaturated carboxylic acid of 3 to 20 carbon atoms, and (D) from 0 to 64% by weight of one or more copolymerizable olefinically unsaturated compounds not already mentioned under (A) to (C), with the proviso that the coploymer has a mean molecular weight of from 1,000 to 20,000 and that the sum of the percentages of (A) to (D) is 100.

2. A surface-coating binder as claimed in claim 1, wherein component (B) is an adduct of vinyl isocyanate or propenyl isocyanate with cyclohexanol, t-butanol, ε-caprolactam or methyl ethyl ketone-oxime, in the molar ratio of isocyanate to blocking agent of 1:1.

3. A surface-coating binder as claimed in claim 1 or 2, wherein the ratio of the number of equivalents of reactive hydrogen atoms of component (C) to the number of equivalents of blocked isocyanate groups of component (B) is about 1:1.

4. A surface-coating binder as claimed in claim 1, 2 or 3, wherein component (C) is an adduct of an epoxy resin, based on bisphenol A and epichlorohydrin and having a molecular weight of from 380 to 3,500, with (a) allyl alcohol or but-1-ene-3-ol and with (b) acrylic acid or methacrylic acid.

5. A process for the cathodic electrocoating of metallic articles, wherein a surface-coating binder as claimed in claim 1, 2, 3 or 4 is used as a self-crosslinking binder.

6. A process for the cathodic electrocoating of metallic objects, wherein a surface-coating binder as claimed in claim 1, 2, 3 or 4 is used in combination with a polyfunctional crosslinking agent as an externally crosslinking binder.

* * * * *